Patented July 25, 1944

2,354,210

UNITED STATES PATENT OFFICE 2,354,210

POLYMERIZATION OF ACRYLIC COMPOUNDS

Ralph A. Jacobson, Landenburg, Pa., assignor to E. I. du Pont de Nemours & Company, Wilmington, Del., a corporation of Delaware No Drawing. Application October 20, 1942, Serial No. 462,750

12 Claims. (Cl. 260—83)

This invention relates to a process for the polymerization of monomeric esters of alpha-methylene monocarboxylic acids. More particularly, it relates to a process of polymerization by means of a new class of catalysts.

The polymerization of monomeric unsaturated compounds such as acrylic acid, its homologs, and esters thereof is facilitated or accelerated by various agencies including heat, actinic light and certain chemical compounds having a catalytic effect on the polymerization. These chemical compounds referred to as catalysts are generally of the type capable of yielding oxygen; benzoyl peroxide is recognized as one of the most effective of these. A practical disadvantage in the use of benzoyl peroxide is that, in some instances, it tends to cause a slight yellow discoloration when used in proportions adequate to accelerate the polymerization reaction of these compounds to a satisfactory degree. On the other hand, hydrogen peroxide is a polymerization catalyst for these monomeric compounds and has no tendency to cause discoloration but it has the drawback of being a decidedly weak catalyst; even increasing the concentration of hydrogen peroxide well beyond ordinary catalytic proportions is not always effective in speeding up the reaction.

This invention has as its object to provide a new non-peroxide type of catalyst for the polymerization of acrylic compounds either alone, in various combinations or conjointly with other polymerizable unsaturated compounds. Another object is to provide a catalyst that will have a strong catalytic action without causing discoloration of the polymerization product such as results from the use of benzoyl peroxide. A further object is to provide improved catalysts in those polymerization processes where the catalyst is brought and maintained in solution, in admixture, or at least in very intimate contact with the material to be polymerized. Other objects will be apparent from the following description of the invention.

These objects are accomplished by the following invention which comprises polymerizing acrylic compounds, such as acrylic acid and its esters, and alpha-alkylacrylic acids and their esters, in the presence of an N-chlorohydantoin.

The present invention may be carried out in several ways depending upon the desired physical form of the polymer. Where the purpose is to obtain a massive piece of polymer, as in so-called "casting," polymerization of the monomer is carried out in the substantial absence of water or other diluents. In general, the monomer is placed in a mold and subjected to polymerizing conditions in the presence of dichlorodimethylhydantoin until converted to a solid mass of polymer. In has been found, contrary to expectations, that a chlorohydantoin, although not a peroxide-type compound, accelerates the rate of polymerization markedly and may be used for such purpose in catalytic amount, or may be used in somewhat greater amount.

Where a polymer in finely divided form is desired, it is convenient to carry out the polymerization in the presence of a liquid diluent, preferably one containing water and in which the polymer is insoluble. The monomeric ester may form a solution, emulsion, or merely a mixture with the liquid diluent and be isolated according to procedures hereinafter described.

Where the polymerizations are carried out by a method which gives a granular product, agents which have the property of being relatively poor dispersing agents and thereby forming nuclei for the formation of granules of the interpolymer may be used.

The preferred embodiments of the invention are illustrated in greater detail by the following examples, in which proportions of reactants are given in parts by weight unless otherwise stated.

EXAMPLE I

*Polymerization of methyl methacrylate in granular form*

A mixture of 60 parts of methyl methacrylate, 1.2 parts of N-dichlorodimethylhydantoin, 2.4 parts of sodium bicarbonate, 150 parts of water and 8 parts of a 3% aqueous solution of partially neutralized polymethacrylic acid is vigorously stirred in a water bath at 90–92° C. Polymerization is complete in about 2 hours. The granular product is filtered, thoroughly washed with water, and dried overnight in a vacuum oven at 60° C. Yield, 51 parts or 85% of theory. The softening temperature of the product is 92° C. and it has excellent molding properties.

EXAMPLE II

*Pressure granular polymerization of methyl methacrylate*

A mixture of 60 parts of methyl methacrylate, 1.2 parts of N-dichlorodimethylhydantoin, 3.6 parts of sodium bicarbonate, 150 parts of water, and 8 parts of a 1% aqueous solution of partially neutralized polymethacrylic acid is vigorously agitated in a stainless steel vessel at 110° C. for 3 hours. The granular product is filtered, thoroughly washed with water, and dried in a vacuum oven overnight at 60° C. Yield 51 parts or 85% of theory. The product molds readily at 165° C. and 2000 lbs./sq. in. pressure to give clear, colorless molded specimens. The softening temperature of the product is 106° C.

EXAMPLE III

*Emulsion polymerization of methyl methacrylate*

A polymerization mixture consisting of 60 parts of methyl methacrylate, 1.2 parts of N-dichlorodimethylhydantoin, 3 parts of the sodium salt of the sulfate ester of oleyl acetate, and 111 parts of water is prepared. The air in the reaction vessel is displaced with nitrogen and the mixture agitated at 40° C. for 20 hours. The mixture is diluted with an equal volume of water, after which steam is passed into the mixture to remove residual monomer. The emulsion is coagulated with 10% aluminum sulfate solution (20 parts), the product filtered, thoroughly washed with water and dried. Yield, 58 parts or 96.7% of theory. The product molds readily at 165° C. and 2000 lbs./sq. in. pressure. The softening temperature of the product is 98° C.

Example IV
*Emulsion polymerization of methyl methacrylate*

A solution of 7.8 parts of a commercial sodium cetyl sulfate dispersing agent containing about 22% active ingredients in 111 parts of water is prepared by heating the mixture on a steam bath. The solution is placed in a suitable pressure vessel, cooled to room temperature and 60 parts of methyl methacrylate and 1.2 parts of N-dichlorodimethylhydantoin added in the order named. The air in the bottle is replaced with nitrogen after which the contents of the reaction vessel are agitated at 40° C. for 20 hours. The mixture is diluted with an equal volume of water after which steam is passed into the mixture to remove residual monomer. The emulsion is coagulated with 10% aluminum sulfate (20 parts), and the product is filtered, thoroughly washed with water, and dried. Yield, 53 parts or 88.3% of theory. The product molds readily at 165° C. and 2000 lbs./sq. in. pressure. The softening temperature of the product is 102° C.

Example V
*Bulk polymerization of methyl methacrylate*

A mixture of 30 parts of methyl methacrylate and 0.15 part of N-dichlorodimethylhydantoin is heated at 45° C. for 18 hours. A hard, colorless resin is obtained by this procedure.

Example VI
*Bulk polymerization of acrylonitrile*

A mixture of 30 parts of acrylonitrile and 0.15 part of N-dichlorodimethylhydantoin is heated at 45° C. for 72 hours. During this period the mixture polymerizes to a solid white mass.

Example VII
*60/40 acrylonitrile/methyl acrylate copolymer*

A polymerization mixture consisting of 111 parts of water, 3 parts of the sodium salt of the sulfate ester of oleyl acetate, 36 parts of acrylonitrile, 24 parts of methyl acrylate, and 1.2 parts of N-dichlorodimethylhydantoin is prepared. The solution is placed in a suitable vessel and the air in the vessel replaced with nitrogen after which the contents of the reaction vessel are agitated at 45° C. for 94 hours. The mixture is diluted with an equal volume of water, after which steam is passed into the mixture to remove residual monomers. The emulsion is coagulated with 10% aluminum sulfate solution (20 parts), the product filtered, thoroughly washed with water, and dried. Yield, 57 parts or 95% of theory. The product molds readily at 160° C. and 1000 lbs./sq. in. pressure to exceedingly tough, light-colored, molded specimens.

Example VIII
*Bulk polymerization of methyl alpha-chloroacrylate*

A mixture of 30 parts of methyl alpha-chloroacrylate and 0.15 part of N-dichlorodimethylhydantoin is heated at 45° C. for 19 hours. A hard, colorless, glass-like resin is obtained by this procedure.

Example IX
*Bulk 50/50 methyl alpha-chloroacrylate/methyl acrylate copolymer*

A mixture consisting of 15 parts of methyl alpha-chloroacrylate, 15 parts of methyl acrylate, and 0.15 part of N-dichlorodimethylhydantoin is heated at 45° C. for several days. An opaque, porcelain-like material is obtained by this procedure.

Example X
*Bulk 50/50 methyl alpha-chloroacrylate/methyl acrylate emulsion copolymer*

A solution of 7.8 parts of commercial sodium cetyl sulfate dispersing agent, containing about 22% active ingredients, in 111 parts of water is prepared by heating the mixture on a steam bath. The solution is placed in a suitable pressure vessel, cooled to room temperature and 30 parts of methyl alpha-chloroacrylate, 30 parts of methyl acrylate, 2.4 parts of sodium bicarbonate, and 1.2 parts of N-dichlorodimethylhydantoin added to the mixture. The air in the bottle is replaced with nitrogen, after which the contents of the reaction vessel are agitated at 40° C. for 48 hours. The mixture is diluted with an equal volume of water and steam is passed into the mixture to remove residual monomers. The emulsion is coagulated with 10% aluminum sulfate solution (20 parts), the product filtered, thoroughly washed with water, and dried. Yield, 46 parts or 76.6% of theory. The softening temperature of the product is 85.5° C.

Example XI
*50/50 methyl alpha-chloroacrylate/styrene copolymer*

A solution of 7.8 parts of commercial sodium cetyl sulfate dispersing agent, containing about 22% active ingredients, in 111 parts of water is prepared by heating the mixture on a steam bath. The solution is placed in a suitable pressure vessel, cooled to room temperature, and 30 parts of methyl alpha-chloroacrylate, 30 parts of styrene, 2.4 parts of sodium bicarbonate and 1.2 parts of N-dichlorodimethylhydantoin added. The air in the vessel is replaced with nitrogen, after which the reaction mixture is agitated at 40° C. for 48 hours. The resulting dispersion is diluted with an equal volume of water, after which steam is passed into the mixture to remove residual monomers. The emulsion is coagulated with 10% aluminum sulfate (20 parts), and the product is filtered, thoroughly washed with water, and dried. Yield, 54 parts or 90% of theory. Pale amber, transparent, somewhat brittle articles are obtained by molding at 150° C. and 2000 lbs./sq. in. pressure. The softening temperature of the product is 106° C.

Example XII
*85/15 methyl methacrylate/vinyl acetate bulk copolymer*

A mixture of 4.5 parts of vinyl acetate, 25.5 parts of methyl methacrylate, and 0.060 part of N-dichlorodimethylhydantoin is heated at 45° C. for 15 hours in a nitrogen atmosphere. The copolymer thus produced is hard, colorless, water-white, and readily moldable at 160° C. and 2000 lbs./sq. in. pressure to give products of exceptional clarity and transparency.

EXAMPLE XIII

*85/15 methyl methacrylate/vinyl acetate granular copolymer*

A mixture of 150 parts of water, 10 parts of a 1% solution of partially neutralized polymethacrylic acid, 2.4 parts of sodium bicarbonate, 7.5 parts of vinyl acetate, 42.5 parts of methyl methacrylate, 0.5 part of N-dichlorodimethylhydantoin, and 1.5 parts of 30% hydrogen peroxide is prepared. The mixture is vigorously agitated by stirring in a bath maintained at 90° C. The monomer mixture polymerizes to granular copolymer in about 1.5 hours. The product is filtered, thoroughly washed with water, and dried. The yield is 45 parts of 90% of theory. It molds readily at 160° C. and 2000 lbs./sq. in. pressure to give molded specimens of exceptional clarity and transparency.

As stated above, the present invention provides an effective means for preparing polymers and copolymers of esters and other derivatives and homologs of acrylic and methacrylic acids. The following list illustrates the type of unsaturated compound which may be used for the preparation of polymers and copolymers: Methyl methacrylate, ethyl methacrylate, butyl methacrylate, octyl methacrylate, 2-nitro-2-methylpropyl methacrylate, methoxyethyl methacrylate, chloroethyl methacrylate, phenyl methacrylate, cyclohexyl methacrylate, and the corresponding esters of acrylic acid; acrylic and methacrylic amide or monoalkyl substituted products thereof; unsaturated ketones, such as methyl vinyl ketone, phenyl vinyl ketone, and methyl isopropenyl ketone; vinyl halides, such as vinyl chloride and vinyl bromide; asymmetrical dihalogenoethylenes, such as dichloroethylene; vinyl carboxylates, such as vinyl acetate, vinyl chloroacetate, vinyl propionate, vinyl stearate; ethylene alpha, beta-dicarboxylic acids or their anhydrides or derivatives, such as diethyl fumarate, diethyl maleate, maleic anhydride, citraconates and mesaconates; mono- and diolefins and substitution products thereof, such as butadiene, isoprene, isobutylene, haloprenes, styrene, monovinylacetylene and similar compounds.

The catalysts of the present invention are hydantoins in which hydrogen atoms attached to the nitrogen atoms have been replaced with chlorine. The formula for 1,3-dichloro-5,5-dimethylhydantoin, as well as the system of numbering used for naming hydantoin derivatives is shown below.

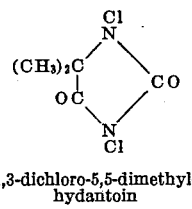
1,3-dichloro-5,5-dimethyl-hydantoin

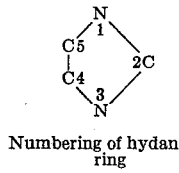
Numbering of hydantoin ring

The product with 66% available chlorine commercially available under the name "Dactin" is very satisfactory. Other hydantoins such as 1,3-dichloro-5-methyl-5-ethylhydantoin, 1,3-dichloro-5,5-diethylhydantoin, 1,3-dichloro-5-methyl-5-propylhydantoin, 1,3-dichloro-5-ethyl-5-butyl-hydantoin, 1,3-dichloro-5-methyl-5-phenylhydantoin, and unsubstituted 1,3-dichlorohydantoin may be employed. Other 1,3-dichlorohydantoins with other alkyl or aryl substituent groups in the 5-position are also satisfactory, the essential requirement being the presence of at least one and preferably two chlorine atoms attached to the nitrogen atoms of the hydantoin ring. Examples of such compounds in addition to those indicated above are: 1-chloro-5,5-dimethylhydantoin, 3-chloro-5,5-dimethylhydantoin, 1-chloro-5-methyl-5-ethylhydantoin and 3-chloro-5-methyl-5-ethylhydantoin.

The polymerization may be carried out under any of the conditions well known in the art. In the preparation of cast articles, for example, the amount of N-dichlorodimethylhydantoin that can be introduced into the substance to be polymerized can be varied widely, depending upon the results, particularly the rate desired. In general, for acrylic and methacrylic esters, 0.1 to 5% of the chlorinated hydantoins based on the polymerizable material present is sufficient, although as much as 4 or 5% may be employed if desired.

When the polymerizations are carried out by emulsion methods, any substances may be used as emulsifying agents, which when dispersed in water, are capable of giving permanent dispersions in the water of the acrylic acid or methacrylic acid derivatives and their copolymer components. The most suitable of emulsifying agents are those which give stable dispersons without promoting hydrolysis of the polymerizable monomers to an undesirable extent. Examples of such agents are:

Sodium salt of the sulfate ester of oleyl acetate
Sodium cetyl sulfate, either pure or in its various commercial forms
Sulfonated paraffin oils
Sodium salts of sulfated long-chain alcohols such as the sodium salt of the sulfate ester of the alcohols obtained by the hydrogenation of coconut oil or sperm oil
Sodium salt of ligninsulfonic acid
Ivory soap
Cetyl p-dimethylaminobenzoate methosulfate
Cetyl trimethylammonium bromide, the formula of which is $C_{16}H_{33}(CH_3)_3NBr$
Cetyl methylpiperidinium methyl sulfate, the formula of which is

Oleoamidoethyldiethylamine acetate, the formula of which is

N-stearylbetaine, the formula of which is

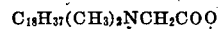

C-cetylbetaine, the formula of which is

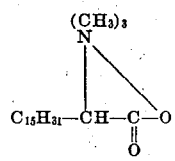

p-Stearamidophenyltrimethylamine methyl sulfate, the formula of which is

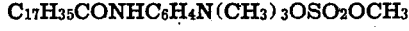

A 2 or 3% solution of the emulsifying agent in water is usually suitable for forming a good dispersion, but a stronger or weaker solution, for example, .02% to 10% may also be employed.

Where the interpolymerization or polymerization is carried out by a method which gives a granular product, agents which have the property of being relatively poor dispersing agents and thereby forming nuclei for the formation of granules of the interpolymer or polymer may be used. The granulation process may be defined as a method for preparing polymers or interpolymers in granular form which comprises dispersing and polymerizing while dispersed, a polymerizable monomer or mixture of monomers in water, by means of a dispersing agent and stirring or shaking, the concentration of the dispersing agent being not substantially greater than an amount sufficient to maintain the monomer in the dispersed phase while stirring is continued and prevent coalescence of the dispersed particles during polymerization, the quantity of dispersing agent also being insufficient to give a permanently dispersed product. It will thus be appreciated that sufficient agitation is essential from the inception of the actual polymerization until the product is actually completely polymerized, since separation into two liquid phases may occur if agitation is interrupted before or shortly after the inception of polymerization. The following granulation agents are given by way of illustration:

The interpolymer prepared from 75% of methacrylic acid and 25% of methyl methacrylate which has been neutralized with sodium hydroxide to a pH of 7–8.
Sodium cellulose glycolate
Sodium starch glycolate
Methyl starch
Soluble starch
Gums of various kinds such as gum tragacanth and acacia
Polymethacrylamide
Partially hydrolyzed polyvinyl acetate
Partially neutralized polymethacrylic acid
Glue
Gelatin
Agar agar
Sodium alginate For polymerization or interpolymerization by the granular method, from 0.1 to 1% solutions of the granulation agent are usually suitable. Those skilled in the art appreciate the fact that the enumerated colloids do not all have equal dispersing powers, e. g., gum tragacanth is less effective than sodium starch glycolate. Accordingly, when changing from one colloid to another a greater or lesser amount thereof must be employed, provided the effectiveness of the substituting colloid is less or greater than that of the colloid first employed. The amount of any effective colloid employed will, of course, be governed by the specific requirements of the monomers coming within the scope of the invention.

As in the casting method of polymerization and the emulsion method, the amount of N-chlorodimethylhydantoin catalyst may be varied considerably. Usually 1 to 2% of N-chlorodimethylhydantoin based on the polymerizable monomers gives satisfactory results but as much as 5% may be required when a difficultly polymerizable monomer is employed. Owing to the fact that hydrochloric acid is generated by the N-dichlorodimethylhydantoin as polymerization proceeds it is usually desirable, and in some cases necessary, to provide some method of neutralizing the acid thus produced. Sodium bicarbonate is a very satisfactory buffer for this purpose although other buffers such as disodium phosphate may also be employed. The amount of sodium bicarbonate or other buffer to be employed can be established by experiment, or it can be computed from the following series of equations. It is assumed that the active oxygen thus liberated accounts for the catalytic activity of N-dichlorodimethylhydantoin in aqueous systems.

$$C_5H_8ON_2Cl_2 \text{ (N-dichlorodimethylhydantoin)} \rightarrow 2Cl$$

$$2Cl + HOH \rightarrow HCl + HClO$$

$$HClO \rightarrow HCl + [O]$$

In some instances it may be desirable to add a slight excess of the sodium bicarbonate or other buffer. In general, the amount to be added will be determined by the pH desired in the polymerizing medium, and this varies with the particular monomer or mixture of monomers to be polymerized.

In the emulsion and granulation methods, the ratios of the dispersed phase (polymerizable monomer or mixture of monomers) to water may be widely varied. Convenient and satisfactory amounts of water are in the range of 100% to about 300% of the dispersed phase. For the solution method, either concentrated or dilute solutions of the polymerizable monomer in organic solvent may be employed. Such solvents as carbon tetrachloride, dioxane, ethylene dichloride, acetone, butyl acetate, benzene and toluene are satisfactory. As already indicated the polymerization may be made in bulk, that is, without solvent, the N-dichlorodimethylhydantoin merely being dissolved in the polymerizable monomer.

It has already been pointed out that highly effective stirring is essential when the polymerizations are carried out by the granulation method. For the casting and solution methods stirring is optional. However, in the emulsion method, the effectiveness of the dispersing agent, especially if small concentrations are employed, is enhanced by agitation of the mixture. Any method of agitation may be used in producing and maintaining the emulsion. The most commonly employed method of mixing is stirring, preferably in vessels containing suitable baffles. Other methods include shaking, tumbling and the use of turbo-mixers. The dispersing agents operable in this invention are, in general, useful in forming stable emulsions which, after they are once formed require little or no agitation. It has been found, however, that polymerization occurs more rapidly in certain emulsions while they are being agitated. It is accordingly preferred to assist the dispersing agent in producing and maintaining the emulsion by mechanical means which may or may not be continuous. It should be emphasized that the dependence of the efficiency of the dispersing agent upon the active ingredient content varies with the nature of the dispersed monomer, dispersing agent, the ratio of aqueous to non-aqueous phases, and the other experimental conditions employed.

The temperature at which the polymerization is carried out will vary with the method employed. For the bulk or casting method a temperature approximating 45° C. is satisfactory. Alternatively, in the bulk polymerization procedure the monomer may be heated at 75 to 100° C. in the presence of N-dichlorodimethylhydantoin to produce a thick sirup which is then cast into molds and further polymerized at lower temperatures such as 45° C., until polymerization is complete. In general, the lower temperatures are preferable because the formation of bubbles is thereby minimized or eliminated. In the emulsion method the preferred temperatures are in the range of 20° C. to 60° C., the optimum being approximately 40 to 45° C. In the granulation procedure the preferred temperatures lie between 75° C. and 125° C. It is apparent that when temperatures of 100° C., that is, the boiling point of water, are used, a closed system is required. The equipment must be capable of withstanding the autogenous pressures thereby produced.

It is realized that the presence of oxygen in the polymerization vessel, while not appearing to have a deleterious effect on the properties of the polymers, may retard their rate of polymerization in certain cases. In these cases, it is therefore preferable to displace the air from the polymerization vessel by means of a gas which does not reduce the rate of polymerization. Suitable gases are nitrogen, carbon dioxide, methane and helium. These gases may be passed through the free space of the polymerization vessel until the air has been completely displaced or may be introduced under sufficiently high pressure, so that the oxygen originally present is so greatly diluted as to have little effect on the rate of polymerization.

The process is not limited to any particular apparatus but it is important that the reaction vessel shall be constructed of material which has no effect on the rate of polymerization or on the quality of the product and is not affected by the aqueous medium or other medium used in carrying out the polymerization. Suitable vessels may be constructed of stainless steel, nickel, silver or lead. Vessels equipped with glass or enamel liners may also be used.

When two or more polymerizable monomers are to be copolymerized by means of N-dichlorodimethylhydantoin or its homologs as catalyst, the present invention involves the addition of the entire amount of the two or more polymerizable compounds to the aqueous or other medium, followed by subsequent polymerization. It is well known that the polymerization rates of the monomers operable in this invention may vary to a considerable extent, and it may also be found in copolymerizing acrylic or methacrylic esters with each other or with other polymerizable monomers that one of the monomeric materials polymerizes more rapidly than the other, thus giving rise to products which may be characterized by non-homogeneity and other inferior physical properties. Under these conditions, the polymerization process may be modified by mixing initially all of the more slowly polymerizing material and a small proportion of the more rapidly polymerizing material and thereafter adding small portions of the more rapidly polymerizing material at about the rate at which this material is used up.

The isolation of the polymers or copolymers will depend upon the method of polymerization employed. When the bulk or casting method of polymerization is employed the finished polymer is obtained directly and no purification or subsequent treatment is usually necessary other than vacuum-drying or seasoning. When the solution method of polymerization is employed the polymer may be isolated by evaporation of the solvent or by pouring the solution into an excess of non-solvent for the polymer or copolymer whereby the latter is precipitated. The precipitated polymers or copolymers may then be thoroughly washed, and dried. When the granulation method of polymerization is employed, the only purification required is to filter the granular product by suitable means, thoroughly wash with distilled water, and dry. When the emulsion method of polymerization is employed the polymers or copolymers may be isolated as finely divided powders by a variety of methods. For example, the dispersion may be sprayed into a heated and/or evacuated chamber whereby the water is removed as vapor and the polymer or copolymer falls to the bottom of the chamber. The polymer may also be isolated by cooling the dispersion below the freezing point of the aqueous medium or by the addition of a large volume of a lower aliphatic alcohol such as methanol or ethanol. The most satisfactory method consists in adding an appropriate amount of an electrolyte solution to the diluted aqueous dispersion with rapid agitation at a temperature just below the point at which the precipitated particles tend to cohere. This procedure yields a polymer in the form of dense granular particles which are readily filtered and washed. Suitable electrolytes include sodium chloride, sodium sulfate, hydrochloric acid, phosphoric acid, calcium chloride, magnesium sulfate, lead nitrate, lead acetate, stannous chloride, and aluminum sulfate. After precipitation of the polymer it is filtered and washed repeatedly with water to remove traces of electrolyte and dispersing agent which may adhere to the particles. Washing with dilute solutions (0.1–1%) of caustic soda or ammonium hydroxide assists in the removal of the last traces of dispersing agent, and at the same time may yield polymers of increased stability. In order to facilitate low-temperature drying of the polymers it is beneficial to employ a final wash with a lower aliphatic alcohol such as methanol or ethanol.

An advantage of the present invention is that it offers a simple and practical means for polymerizing acrylic esters and methacrylic esters and other derivatives of acrylic and methacrylic acids, either alone, in various combinations or conjointly with other polymerizable ethylenic compounds. Furthermore, the type of catalyst employed in the present invention is quite distinct from the customary organic and inorganic peroxide catalysts used heretofore in that it is not a peroxide or a per salt. In this respect, it has the advantage over peroxide-type catalysts in being free from sudden decomposition or explosion hazards.

The polymers of methyl methacrylate and its copolymers with other acrylic and methacrylic derivatives or other polymerizable compounds being usually soluble in the common organic solvents are well adapted as film-forming materials. In many cases the films are colorless, strong, tough and flexible. Adhesion of the films laid down on wood, glass and metals and their solution in solvents is often excellent, hence the unpigmented solutions are useful as clear lacquers, varnishes, or as adhesives whereas the pigmented solutions are suitable for coating compositions such as paints or pigmented lacquers for wood, metal, paper, leather, and the like. Certain of the unpigmented interpolymer films or sheetings are also useful as transparent wrapping materials, safety-glass interlayers, or adhesives such as by lamination. Unpigmented solutions, emulsions, or dispersions of the interpolymers are suitable for impregnating or coating paper, textiles, fibers, wood, or other porous or semi-porous materials to contribute such properties as strength, toughness, flexibility, and impermeability to water. Many of the interpolymers are admirably adapted to molding by heat and pressure with flowing characteristics particularly well suited for injection molding. The molded articles are tough, strong, flexible and suitable for mechanical working such as punching or drilling. In general, they are satisfactory for replacing cellulose derivatives such as nitrocellulose, cellulose acetate, ethylcellulose, etc., in the manufacture of penholders, knife handles, umbrella handles, electrical insulation materials, wrapping material, and the like.

As many apparently widely different embodiments of this invention may be made without departing from the spirit and scope thereof, it is to be understood that this invention is not to be limited to the specific embodiments shown and described.

I claim:

1. In the polymerization of a polymerizable mass containing an acrylic compound, the improvement which comprises carrying out the polymerization reaction in the presence of an N-chlorinated hydantoin.

2. In the polymerization of a polymerizable mass containing a monomeric ester of an alpha-methylene monocarboxylic acid, the improvement which comprises carrying out said polymerization reaction in the presence of an N-chlorinated hydantoin.

3. In the polymerization of a polymerizable mass containing an alpha-methylene monocarboxylic acid, the improvement which comprises carrying out said polymerization reaction in the presence of an N-chlorinated hydantoin.

4. In the polymerization of a polymerizable mass containing an ester of methacrylic acid, the improvement which comprises carrying out said polymerization reaction in the presence of an N-chlorinated hydantoin.

5. In the polymerization of a polymerizable mass containing methyl methacrylate, the improvement which comprises carrying out said polymerization reaction in the presence of an N-chlorinated hydantoin.

6. In the process of polymerizing methyl methacrylate, the improvement which comprises carrying out said polymerization reaction in the presence of an N-chlorinated hydantoin.

7. The process in accordance with claim 1 characterized in that the chlorinated hydantoin is an N-dichlorohydantoin.

8. The process in accordance with claim 1 characterized in that the chlorinated hydantoin is 1,3-dichlorohydantoin, having at least one hydrogen in the 5-position, replaced with an alkyl group.

9. The process in accordance with claim 1 characterized in that the chlorinated hydantoin is 1,3-dichloro-5,5-dimethylhydantoin.

10. In a process for the emulsion polymerization of polymerizable compositions containing acrylic compounds, the improvement which comprises carrying out the reaction in the presence of an N-chlorinated hydantoin.

11. In a process for the granular polymerization of polymerizable compositions containing acrylic compounds, the improvement which comprises carrying out the reaction in the presence of an N-chlorinated hydantoin.

12. In a process for the bulk polymerization of polymerizable compositions containing acrylic compounds, the improvement which comprises carrying out the reaction in the presence of an N-chlorinated hydantoin.

RALPH A. JACOBSON.

CERTIFICATE OF CORRECTION.

Patent No. 2,354,210. July 25, 1944.

RALPH A. JACOBSON.

It is hereby certified that error appears in the printed specification of the above numbered patent requiring correction as follows: Page 1, first column, line 59, for the word "In" read --It--; page 3, first column, line 22, for "parts of" read --parts or--; and second column, line 22, for "5%" read --0.5%--; line 33, for "dispersons" read --dispersions--; and that the said Letters Patent should be read with this correction therein that the same may conform to the record of the case in the Patent Office.

Signed and sealed this 26th day of September, A. D. 1944.

Leslie Frazer (Seal) Acting Commissioner of Patents.